United States Patent
Hayashi et al.

(10) Patent No.: US 8,157,184 B2
(45) Date of Patent: Apr. 17, 2012

(54) EXPANSION VALVE, HEAT PUMP TYPE REFRIGERATION CYCLE APPARATUS, AND AIR HANDLING UNIT

(75) Inventors: Takahito Hayashi, Tokorozawa (JP); Hideki Sekiguchi, Iruma (JP); Yutaka Kaneko, Tokorozawa (JP); Tamami Fukuyasu, Tokorozawa (JP); Takashi Hirakawa, Sayama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 12/957,837

(22) Filed: Dec. 1, 2010

(65) Prior Publication Data

US 2011/0120161 A1    May 26, 2011

Related U.S. Application Data

(63) Continuation-in-part of application No. 12/402,134, filed on Mar. 11, 2009, which is a continuation-in-part of application No. 12/128,933, filed on May 29, 2008, now Pat. No. 7,854,390.

(30) Foreign Application Priority Data

Dec. 26, 2008 (JP) ................................ 2008-332324

(51) Int. Cl.
*F25B 41/04* (2006.01)
*F25B 41/06* (2006.01)

(52) U.S. Cl. ........................... 236/92 B; 62/160; 62/222

(58) Field of Classification Search ................ 236/92 B; 62/159, 160, 205, 222; 251/129.01, 129.22
See application file for complete search history.

(56) References Cited

U.S. PATENT DOCUMENTS

| 4,372,486 | A | 2/1983 | Tomioka et al. |
| 6,354,510 | B1 | 3/2002 | Petersen |
| 7,854,390 | B2 * | 12/2010 | Hayashi ...................... 236/92 B |
| 2009/0293520 | A1 * | 12/2009 | Hayashi et al. .................. 62/222 |

FOREIGN PATENT DOCUMENTS

| JP | H665915 | 8/1994 |
| JP | 2000266194 | 9/2000 |

* cited by examiner

*Primary Examiner* — Marc Norman
(74) *Attorney, Agent, or Firm* — Reising Ethington P.C.

(57) ABSTRACT

A first expansion valve is provided in an outdoor unit, and a second expansion valve is provided in an indoor unit. A pipe line connects a first joint pipe of the first expansion valve and a second joint pipe of the second expansion valve. When a refrigerant flows in from the second joint pipe and flows out from the first joint pipe, the first and second expansion valves are in a full open state due to pressure of the refrigerant. When the refrigerant flows in from the first joint pipe and flows out from the second joint pipe, the first and second expansion valves are in semi-closed state (flow rate controlling state). In a cooling mode, the second expansion valve expands the refrigerant just before an indoor heat exchanger, and in a heating mode, the first expansion valve expands the refrigerant just before an outdoor heat exchanger. In both heating and cooling mode, a large amount of refrigerant flows through the pipe line to reduce pressure loss.

1 Claim, 12 Drawing Sheets

ZERO PULSE

150 PULSES

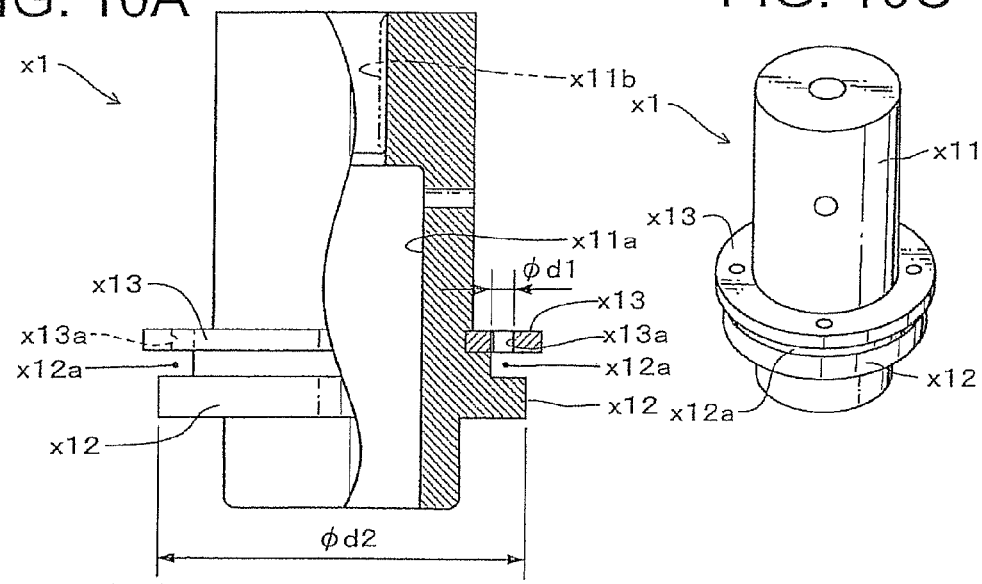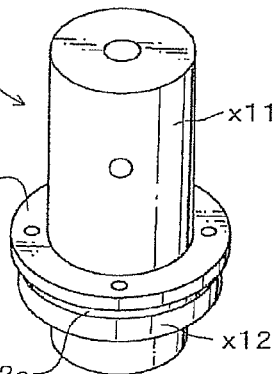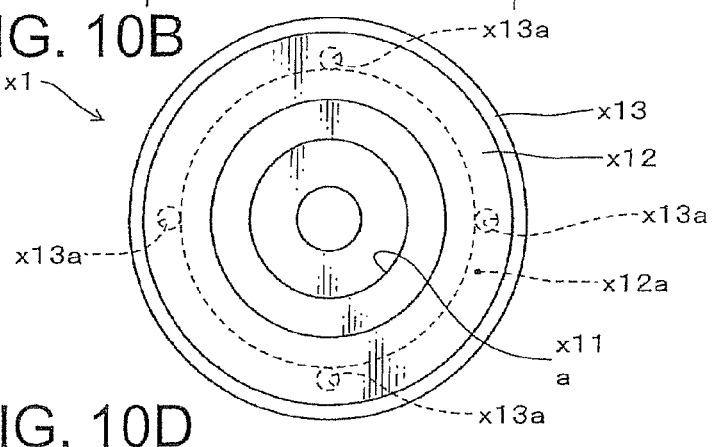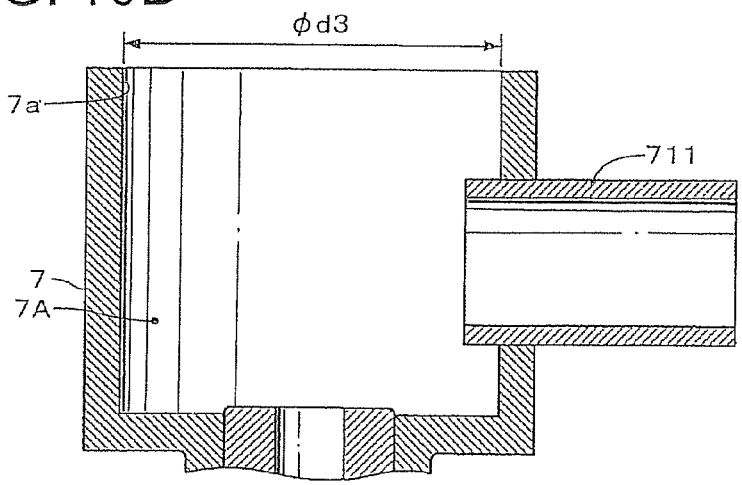
FIG. 10A
FIG. 10B
FIG. 10C
FIG. 10D

EXPANSION VALVE, HEAT PUMP TYPE REFRIGERATION CYCLE APPARATUS, AND AIR HANDLING UNIT

REFERENCE TO RELATED APPLICATIONS

This application is a Continuation-in-Part of U.S. patent application Ser. No. 12/402,134 filed Mar. 11, 2009 which is a Continuation-in-Part of U.S. patent application Ser. No. 12/128,933 filed May 29, 2008 and claims the benefit of Japanese Patent Application No. 2008-332324 filed on Dec. 26, 2008.

BACKGROUND

1. Field of the Invention

The present invention relates to an expansion valve for controlling a flow rate of a refrigerant in a first flow direction of the refrigerant and for discharging the refrigerant in a second flow direction, a heat pump type refrigeration cycle apparatus using the expansion valve, and an air handling unit having the heat pump type refrigeration cycle apparatus.

2. Description of the Related Art

Conventionally, in the heat pump type refrigeration cycle apparatus, an expansion valve is interposed between an outdoor heat exchanger and an indoor heat exchanger. In a cooling mode, a refrigerant from the outdoor heat exchanger is expanded by the expansion valve and guided to the indoor heat exchanger. In a heating mode, the refrigerant from the indoor heat exchanger is expanded by the expansion valve and guided to the outdoor heat exchanger. Various expansion valves to control the flow rate of the refrigerant for adapting to normal operation, defrosting operation, and dehumidifying operation are proposed (for example, Japanese Patent Application Unexamined Publication No. 2000-266194 and Japanese Patent Application Examined Publication No. H6-65915).

Incidentally, in many heat pump type refrigeration cycle apparatuses, the expansion valve is provided at the outdoor heat exchanger (outdoor unit) side. In this case, the refrigerant expanded by the expansion valve flows into the indoor heat exchanger via a long pipe line. Therefore, there is a problem that the expanded refrigerant is subject to pressure loss, and flow rate control by the expansion valve is difficult. The same is true in a case that the expansion valve is provided at the indoor heat exchanger side.

Accordingly, an object of the present invention is to provide an expansion valve to control the flow rate at the indoor heat exchanger in the cooling mode, and to control the flow rate at the outdoor heat exchanger in the heating mode, and a heat pump type refrigeration cycle apparatus using the expansion valve.

SUMMARY

In accordance with at least one presently preferred implementation, there is provided an expansion valve for controlling a flow rate of a refrigerant in a first flow direction of the refrigerant and for discharging the refrigerant in a second flow direction, the expansion valve including:

a valve housing having a first port communicating with a cylindrical main valve chamber and with a side part of the main valve chamber, and a second port communicating with an end of the main valve chamber in an axial direction thereof;

a piston-shaped valve seat slidably disposed in the main valve chamber in the axial direction of the main valve chamber, and having a sub valve chamber opposed to the second port in the main valve chamber, a valve port for connecting the sub valve chamber to the second port, and a connecting hole for always connecting the sub valve chamber to the first port;

a valve plug for opening and closing the valve port of the valve seat by moving relative to the valve seat in the axial direction; and a driving member for driving the valve plug in the axial direction, wherein in a case that the first port is under high refrigerant pressure and the second port is under low refrigerant pressure, a flow rate of the refrigerant flowing from the sub valve chamber through a path between the valve plug and the valve port is controlled by closing the second port with the valve seat seated around the second port due to differential pressure between the first and second ports and by controlling a position of the valve plug in the axial direction with the driving member, and wherein in a case that the first port is under low refrigerant pressure and the second port is under high refrigerant pressure by making the refrigerant flow reversely, the refrigerant is discharged to the first port via the second port and the main valve chamber, said second port is opened by moving the valve plug in the axial direction with the driving member and by separating the valve seat from the second port due to the differential pressure between the second and first ports.

Preferably, the valve seat is a piston type member of which bottom wall at the second port side is a tapered wall, and the connecting hole is provided at a side of the valve seat.

Preferably, the valve seat is composed of a circular disk on which the valve port is formed, and a plurality of guiding board formed at an outer periphery of the circular disk, and slidingly contact an inside of the main valve chamber, and the connecting holes are formed between the adjacent guiding walls.

Preferably, the driving member is composed of a rotor case fixed around an opening of the valve housing opposite to the first port to form a cylindrical rotor chamber, a rotor having a rotor shaft in the axial direction of the rotor chamber and the main valve chamber and rotatably and movably disposed in the rotor chamber in the axis direction, and a stator coil attached to an outer circumference of the rotor case and driving the rotor, and the valve body is disposed at the rotor shaft near the valve seat, said driving member further including a supporting member fixed to the opening of the valve housing for separating the main valve chamber from the rotor chamber and for supporting the rotor shaft of the rotor, and configured to control an opening of the valve port by moving the rotor and the rotor shaft in the axial direction with a screw mechanism of the supporting member and the rotor shaft using a rotation of the rotor, and configured to equalize the pressure between the main valve chamber and the rotor chamber when the rotor is moved in the axial direction using a pressure equalizing path communicating with the main valve chamber and the rotor chamber, wherein the supporting member includes: a fitting part for fitting into the opening of the valve housing; and a flange part fixed to an end around the circumference of the opening of the valve housing, wherein a communicating path opening at the rotor chamber side is formed on the flange, and an outer diameter of the fitting part is a specific amount smaller than an inner diameter of an inner circumference of the valve housing, wherein a concave part concaved in a radial direction perpendicular to the axial direction is formed on the fitting part at the flange side, and a gap between the outer circumference of the fitting part and the inner circumference of the valve housing communicates with the communicating path via the concave part, and wherein the pressure equalizing path is composed of the gap between the outer circumference of the fitting part and the inner circumference of the valve housing and the communicating path.

According to another aspect of the present invention, there is provided a heat pump type refrigeration cycle apparatus in which a cooling mode and a heating mode is switched by reversing a flow direction of refrigerant, the refrigeration cycle apparatus including:

two of the above-described expansion valves consisting of first and second expansion valves, and interposed between an indoor heat exchanger and an outdoor heat exchanger, wherein first ports of the expansion valves are connected to each other via a pipe line, and wherein a second port of the first expansion valve is connected to the outdoor heat exchanger at the outdoor heat exchanger side, and a second port of the second expansion valve is connected to the indoor heat exchanger at the indoor heat exchanger side.

According to another aspect of the present invention, there is provided an air handling unit having the above-described heat pump type refrigeration cycle apparatus, wherein the first expansion valve is disposed in an outdoor unit together with the outdoor heat exchanger, and the second expansion valve is disposed in an indoor unit together with the indoor heat exchanger.

These and other objects, features, and advantages of the present invention will become more apparent upon reading of the following detailed description along with the accompanied drawings.

BRIEF DESCRIPTION OF THE DRAWINGS

FIGS. 10A, 10B, and 10C are a partially broken side view, a bottom view, and a perspective view showing a supporting member as a first example of the expansion valve according to the second embodiment;

FIG. 10D is a sectional view showing a valve housing;

DETAILED DESCRIPTION OF PREFERRED EMBODIMENTS

Embodiments of an expansion valve, a heat pump type refrigeration cycle apparatus, and an air handling unit will be explained with reference to figures.

Figure 1:
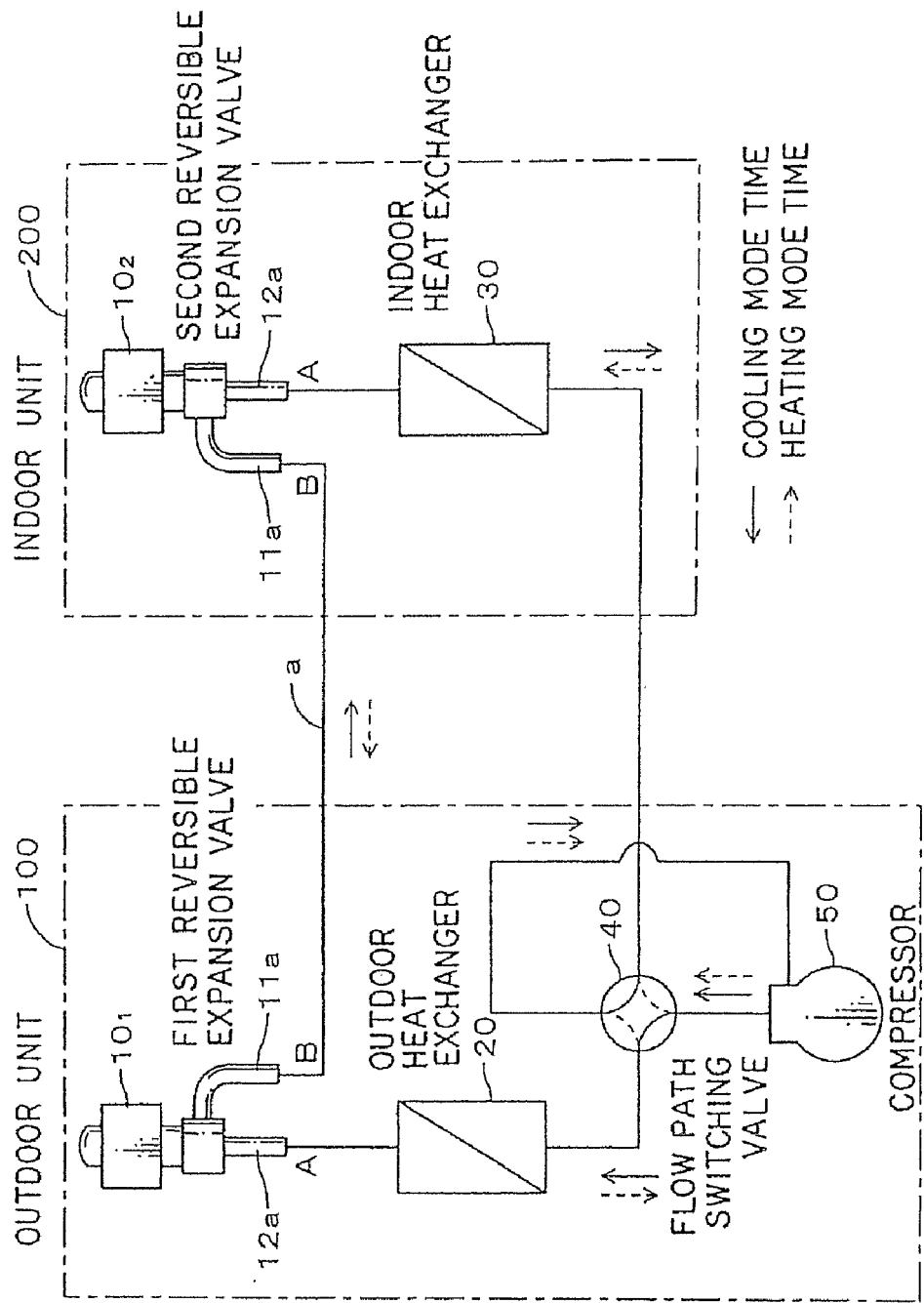
FIG. 1 is a schematic view showing a heat pump type refrigeration cycle apparatus according to a first embodiment of the present invention.

As shown in FIG. 1, a first expansion valve $10_1$ is mounted on an outdoor unit 100, and a second expansion valve $10_2$ is mounted on an indoor unit 200. Further, an outdoor heat exchanger 20 is mounted on the outdoor unit 100, and an indoor heat exchanger 30 is mounted on the indoor unit 200. A flow path switching valve 40 and a compressor 50 are mounted on the outdoor unit 100. The expansion valves $10_1$, $10_2$, the outdoor heat exchanger 20, the indoor heat exchanger 30, the flow path switching valve 40 and the compressor 50 are connected as shown in FIG. 1, and compose the heat pump type refrigeration cycle apparatus. Incidentally, an accumulator, a pressure sensor, a thermal sensor and the like are not shown in FIG. 1.

The flow path switching valve 40 switches the flow path of the refrigeration cycle apparatus to a cooling mode or a heating mode. In the cooling mode as indicated by a solid-line arrow in FIG. 1, the refrigerant compressed by the compressor 50 flows from the flow path switching valve 40 to the outdoor heat exchanger 20, then flows via the first expansion valve $10_1$ and the pipe line "a" to the second expansion valve $10_2$. Then, the refrigerant is expanded by this second expansion valve $10_2$ and flows to the indoor heat exchanger 30. The refrigerant flowing into the indoor heat exchanger 30 flows into the compressor 50 via the flow path switching valve 40. On the other hand, in the heating mode as indicated by a dashed-line arrow in FIG. 1, the refrigerant compressed by the compressor 50 flows from the flow path switching valve 40 into the indoor heat exchanger 30, then flows via the second expansion valve $10_2$ and the pipe line "a" to the first expansion valve $10_1$. Then, the refrigerant is expanded by this first expansion valve $10_1$ and circulates to the outdoor heat exchanger 20, the flow path switching valve 40, and the compressor 50 sequentially.

The expansion valves $10_1$, $10_2$ are in a later-described fully open state not to control the flow rate of the refrigerant, or in a semi-closed state to control the flow rate of the refrigerant. In the fully open state, the refrigerant flows in from a later described joint pipe 12a at a side "A" and flows out to a joint pipe 11a at a side "B". Further, in the semi-closed state, the refrigerant flows in from the joint pipe 11a at a side "B" and flows out to the joint pipe 12a at a side "A". Namely, in the cooling mode, the first expansion valve $10_1$ is in the fully open state, and the second expansion valve $10_2$ is in the semi-closed state. Further, in the heating mode, the second expansion valve $10_2$ is in the fully open state, and the first expansion valve $10_1$ is in the semi-closed state. Accordingly, in the cooling mode, the outdoor heat exchanger 20 works as a condenser, and the indoor heat exchanger 30 works as an evaporator to cool a room interior. Further, in the heating mode, the outdoor heat exchanger 20 works as the evaporator, and the indoor heat exchanger 30 works as the condenser to heat the room interior.

Further, in the cooling mode, the second expansion valve $10_2$ expands the refrigerant just before the indoor heat exchanger 30, and in the heating mode, the first expansion valve $10_1$ expands the refrigerant just before the outdoor heat exchanger 20. In both the cooling and heating mode, a large amount of refrigerant flows through the pipe line "a" connecting the first expansion valve $10_1$ and the second expansion valve $10_2$. Therefore, pressure loss before the expansion valve having a flow rate control function is reduced, and running performance is improved.

Next, the first expansion valve $10_1$ and the second expansion valve $10_2$ according to a first embodiment will be explained with reference to FIGS. 2 and 3.

Figure 2:
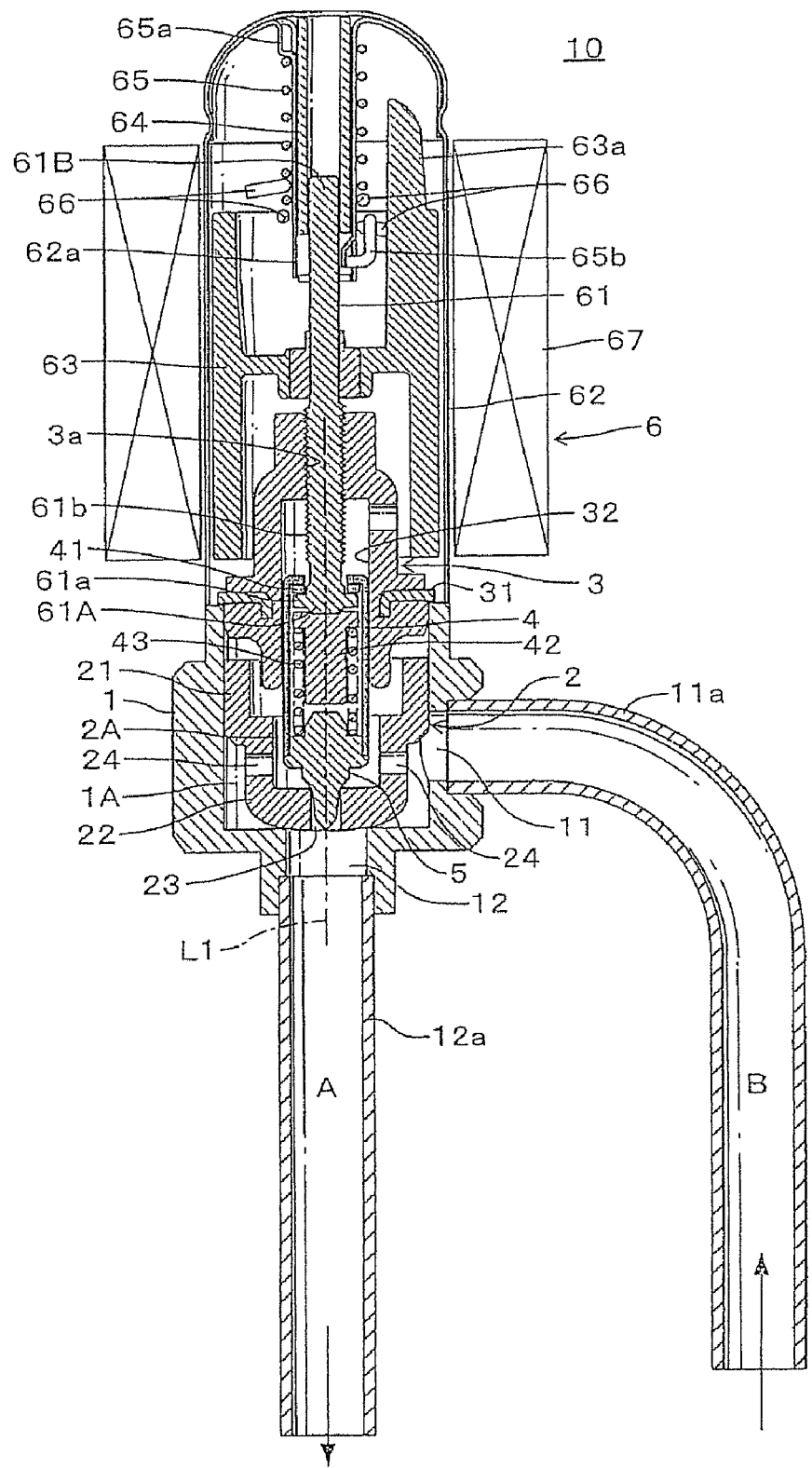
FIG. 2 is a vertical sectional view showing an expansion valve in a closed state according to the first embodiment of the present invention.
Figure 3:
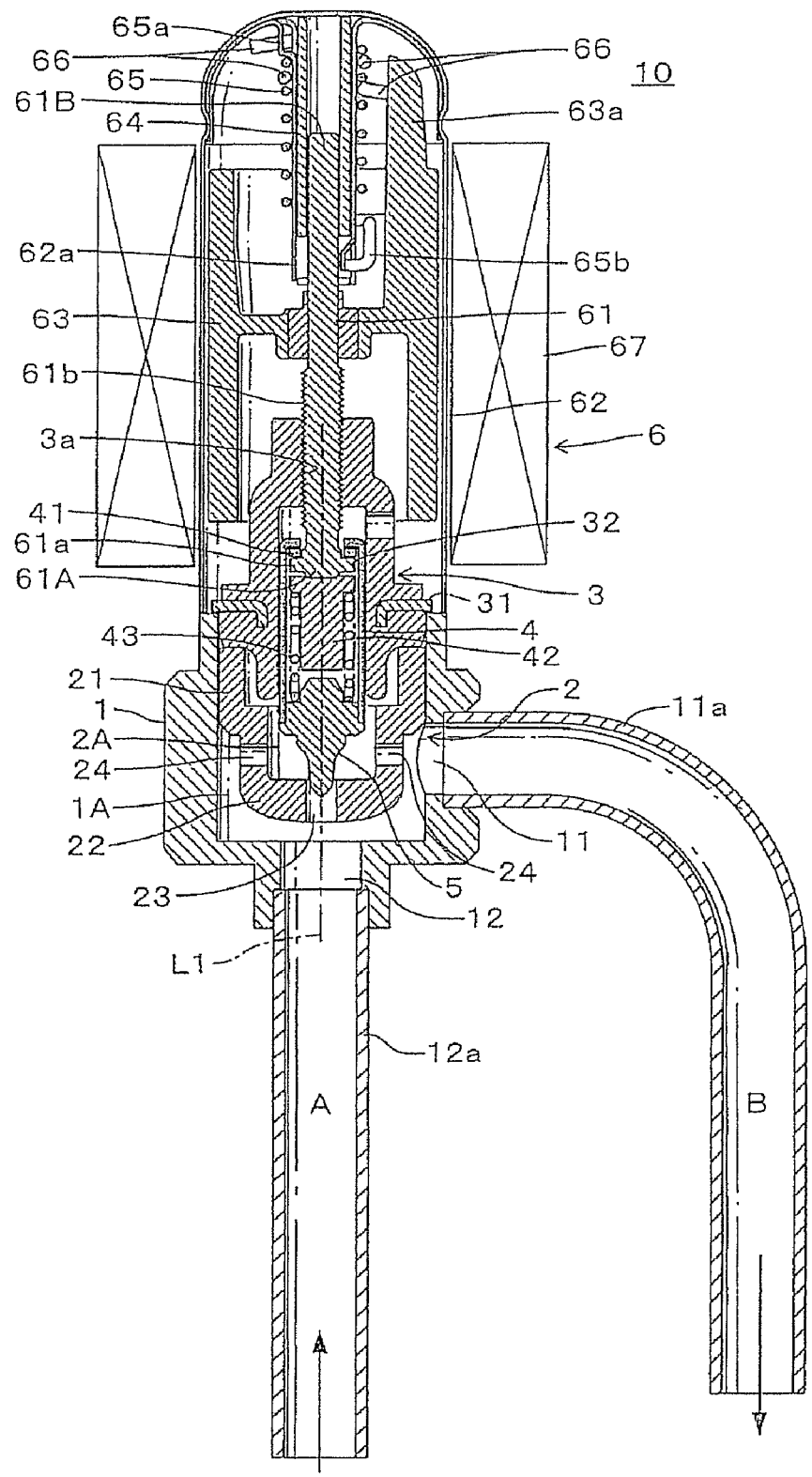
FIG. 3 is a vertical sectional view showing the expansion valve in a fully open state.

As shown in FIGS. 2 and 3, each of the first expansion valve $10_1$ and the second expansion valve $10_2$ (hereafter referred to as expansion valve 10) includes a valve housing 1. A cylindrical main valve chamber 1A, a first port 11 opened at an inner periphery of the main valve chamber 1A, and a second port 12 opened at an end of the main valve chamber 1A in a direction of an axis L1 are formed on the valve housing 1. The joint pipes 11a, 12a are respectively attached to the first port 11 and the second port 12.

A valve seat 2 is provided in the main valve chamber 1A. The valve seat 2 includes a large diameter part 21 having a large diameter about the axis L1 of the main valve chamber 1A, and a small diameter part 22. An inside of this small diameter part 22 is a sub valve chamber 2A. Further, a valve port 23 for connecting the sub valve chamber 2A to the second port 12, and a plurality of high pressure inlets 24 as connecting holes for constantly connecting the sub valve chamber 2A to the first port 11 are formed on the small diameter part 22. The valve seat 2 is formed in a piston shape. An outer periphery of the large diameter part 21 slidably abuts on the inner periphery of the main valve chamber 1A. The valve seat 2 slides on the main valve chamber 1A in the axis L1 direction. A relationship between a capacity coefficient $C_{24}$ of a valve of the high pressure inlets 24 and a capacity coefficient $C_{23}$ of a valve of the valve port 23 is $C_{24} > C_{23}$. Therefore, as described later, when the second port 12 is in high pressure, a differential pressure between the second port 12 and the sub valve chamber 2A separates the valve seat 2 from the second port 12.

A support member 3 is fixed to an upper side of the valve housing 1 with a fixing bracket 31. A long guiding hole 32 is formed on the support member 3 in the axis L1 direction. A cylindrical valve holder 4 is slidably fitted into the guiding hole 32 in the axis L1 direction. Thus, the valve holder 4 is movable relative to the valve housing 1 via the support member 3 in the axis L1 direction.

The valve holder 4 is coaxially arranged with the main valve chamber 1A. A valve plug 5 of which end is formed in a needle shape is fixed to a bottom of the valve holder 4 at the sub valve chamber 2A side. When the valve plug 5 and the valve holder 4 are moved in the sub valve chamber 2A of the valve seat 2 in the axis L1 direction, an opening space of the valve port 23 is increased or decreased. Thus, the flow rate of the refrigerant flowing from the first port 11 to the second port 12 is controlled. Incidentally, the valve plug 5 is movable in between a fully closed position as shown in FIG. 2 and a full open position as shown in FIG. 3.

The valve holder 4 is engaged with a rotor shaft 61 of a stepping motor 6 as a later-described driving member. Namely, a flange 61a is integrally formed on a lower end 61A of the rotor shaft 61. This flange 61a and an upper end of the valve holder 4 hold a washer 41. The lower end 61A of the rotor shaft 61 is rotatably engaged with the upper end of the valve holder 4. Owing to this engagement, the valve holder 4 is rotatably suspended by the rotor shaft 61. A spring bracket 42 is movably provided in the valve holder 4 in the axis L1 direction. A compression spring is provided in between the spring bracket 42 and the valve plug 5 under a predetermined load. Thus, the spring bracket 42 is pushed upward to abut on the lower end 61A of the rotor shaft 61.

A male thread 61b is formed on the rotor shaft 61. This male thread 61b is screwed into a female thread 3a formed on the support member 3. Thus, as the rotor shaft 61 is rotated, the rotor shaft 61 is moved in the axis L1 direction.

A case 62 of the stepping motor 6 is gas-tightly fixed to the upper end of the valve housing 1 by welding or the like. A magnet rotor 63 of which outer periphery is multi-magnetized is rotatably provided in the case 62. A rotor shaft 61 is fixed to the magnet rotor 63. A cylindrical guide 62a is suspended from a ceiling of the case 62. A cylindrical bearing 64 is provided inside the guide 62a. An upper end 61B of the rotor shaft 61 is rotatably fitted into the bearing 64.

A screw guide 65 attached to the outer periphery of the guide 62a and a movable stopper 66 screwed into the screw guide 65 are provided in the case 62. A projection 63a is formed on the magnet rotor 63. As the magnet rotor 63 is rotated, the projection 63a pushes the movable stopper 66, so that the movable stopper 66 is moved rotatingly up and down because the movable stopper 66 is screwed into the screw guide 65.

Owing to this vertical movement of the movable stopper 66, the movable stopper 66 abuts on a stopper 65a at an upper end of the screw guide 65, or a stopper 65b at a lower end of the screw guide 65 to open or close the expansion valve 10.

A stator coil 67 is mounted on an outer periphery of the case 62. The stepping motor 6 as the driving member rotates the magnet rotor 63 corresponding to a number of pulses of a pulse signal applied to a stator coil (not shown) of the stator coil 67. Owing to the rotation of the magnet rotor 63, the rotor shaft 61 is rotated and the rotor shaft 61 is moved in the axis L1 direction, so that the valve plug 5 and the valve holder 4 are moved in the axis L1 direction.

With the above-described structure, the expansion valve 10 operates as follows. FIG. 2 shows a state that the high pressure refrigerant flows in from the joint pipe 11a (a first port 11), then, the flow rate of the refrigerant is controlled, and then, the expanded refrigerant flows out from the joint pipe 12a (a second port 12). In this case, the first port 11, the main valve chamber 1A, the high pressure inlets 24, and the sub valve chamber 2A are under high pressure, and the second port 12 is under low pressure. Therefore, due to the differential pressure of the refrigerant between them, the valve seat 2 is seated around the second port 12 to close the second port. Then, when the stepping motor 6 controls the position of the valve plug 5 in the axis L1 direction, the flow rate of the refrigerant flowing from the sub valve chamber 2A via between the valve plug 5 and the valve port 23 is controlled.

On the other hand, the compressor 50 is stopped and the flow path switching valve 40 is switched. At this time, the stepping motor 6 controls to separate the valve plug 5 from the valve seat 2 (upward), and then the compressor 50 is started again. Thus, when the high pressure refrigerant flows in from the joint pipe 12a (second port 12), and the refrigerant flows out from the joint pipe 11a (first port 11), the second port 12 is under high pressure, and the main valve chamber 1A, the sub valve chamber 2A, and the first port 11 are under low pressure. Then, as shown in FIG. 3, the differential pressure separates the valve seat 2 from the second port 12, namely, the second port opens. Thus, the refrigerant flows via the second port 12 and the main valve chamber 1A and is discharged from the first port 11.

Figure 4A:
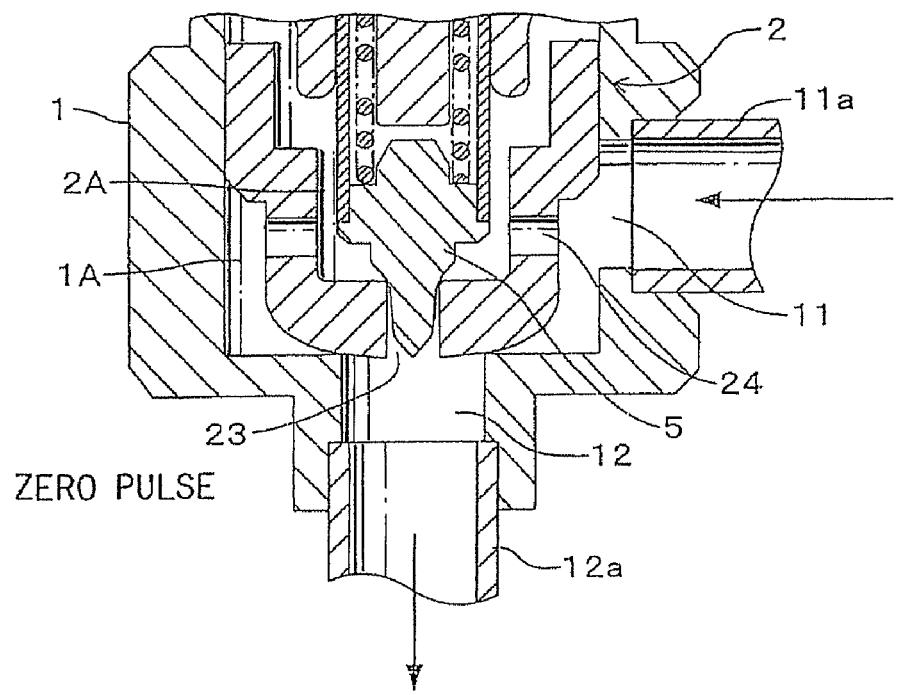
FIGS. 4A and 4B are schematic views showing a positional relationship between a valve plug and a valve seat when a flow rate of the expansion valve is controlled.
Figure 4B:
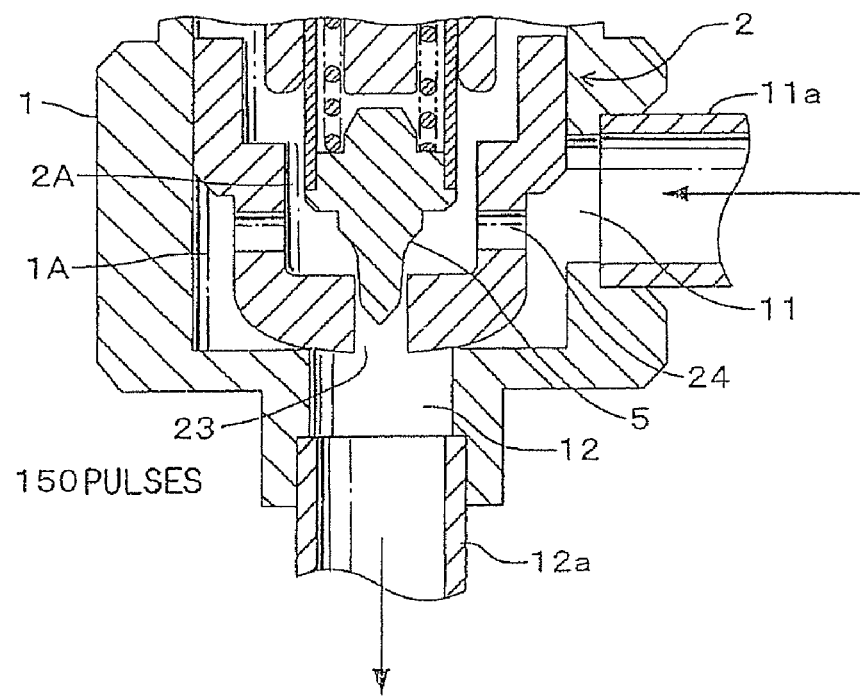
Figure 5A:
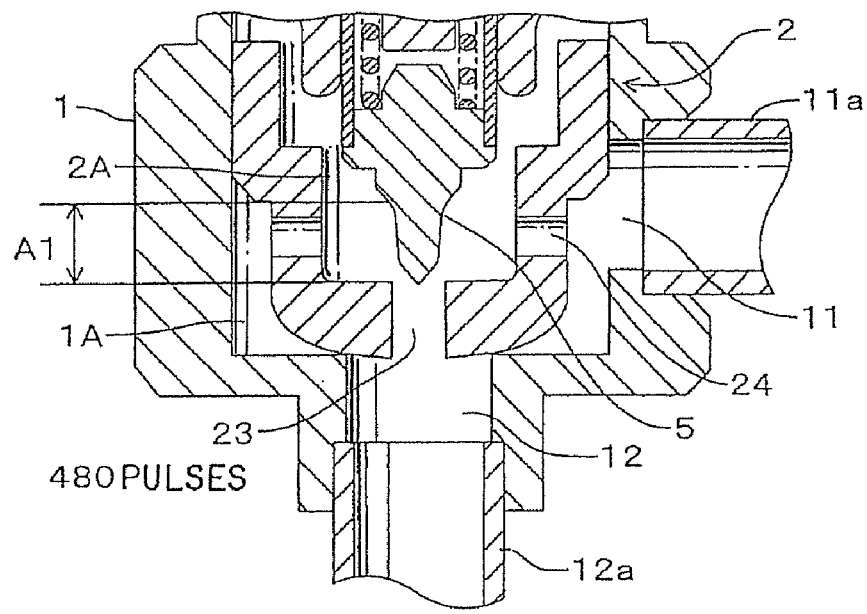
FIGS. 5A and 5B are schematic views showing a positional relationship between the valve plug and the valve seat when the expansion valve is fully open.
Figure 5B:
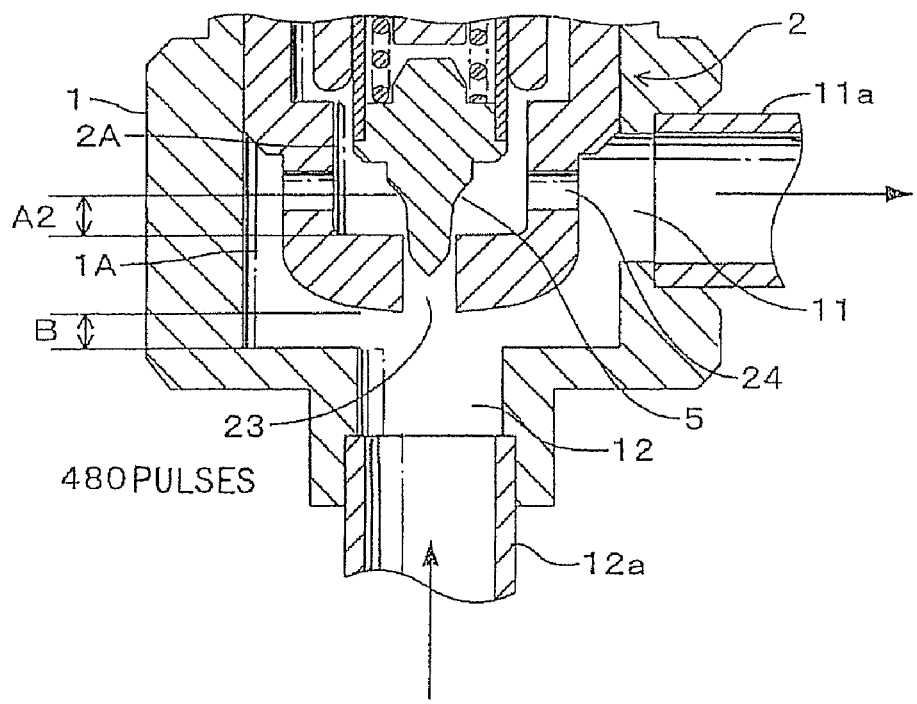

FIGS. 4A and 4B are schematic views showing a positional relationship between the valve plug 5 and the valve seat 2 when the flow rate is controlled, and FIGS. 5A and 5B are schematic views showing a positional relationship between the valve plug 5 and the valve seat 2 when the expansion valve is fully open. Incidentally, because the stepping motor 6 is driven by the pulse signals as described above, the number of rotation corresponds to the number of pulses of the pulse signals applied from a state that the valve plug 5 is at the lower end. FIG. 4A shows a state that the number of the pulse of the stepping motor 6 is zero, and the valve port 23 is closed by the valve plug 5. FIG. 4B shows a state that the number of the pulse is 150. The flow rate is controlled in a range of zero to 480 pulses. FIG. 5A shows a state just before a state shown in FIG. 3 that the compressor 50 is stopped, and the number of the pulse is 480 pulses to separate the valve plug 5 from the valve port 23. Then, after the flow path switching valve 40 is switched, and the compressor 50 is started again, the high pressure refrigerant flows in from the second port 12 and the valve seat 2 is separated from the second port 12 as shown in FIG. 5B. Incidentally, when a clearance between the valve plug 5 and the valve seat 2 in FIG. 5A is set to "A1", and a clearance between the valve seat 2 and an area around the second port 12 is set to "B", the expansion valve 10 is so designed that A1>B. Therefore, even when the valve seat 2 is separated and the upper end of the valve seat 2 abuts on the support member 3, namely, the valve seat 2 is at the highest position, there is a clearance A2 between the valve plug 5 and the valve seat 2, and the valve plug 5 never bite the valve port 23.

Figure 6:
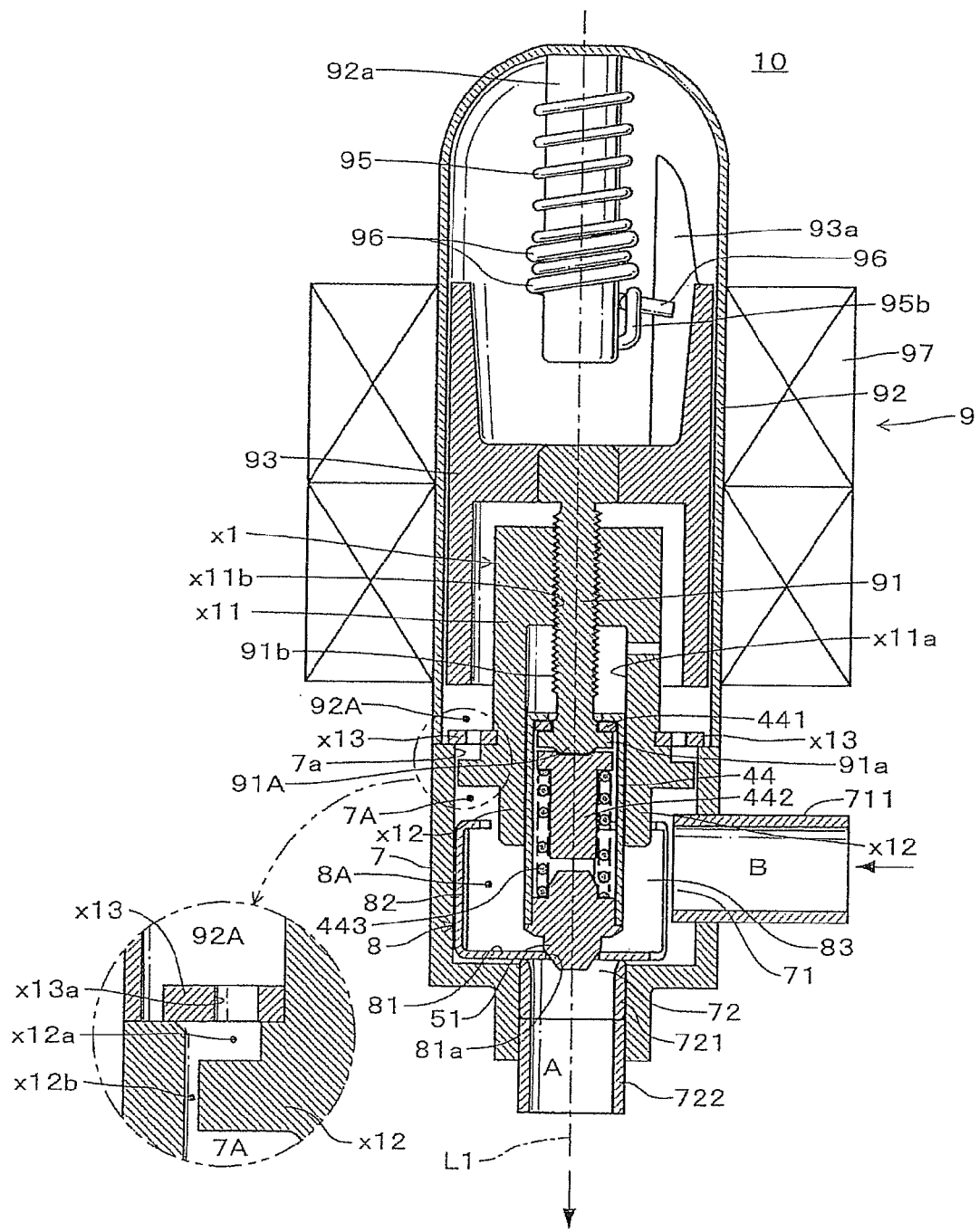
FIG. 6 is a vertical section view showing the closed compaction valve 10 according to a second embodiment.
Figure 7:
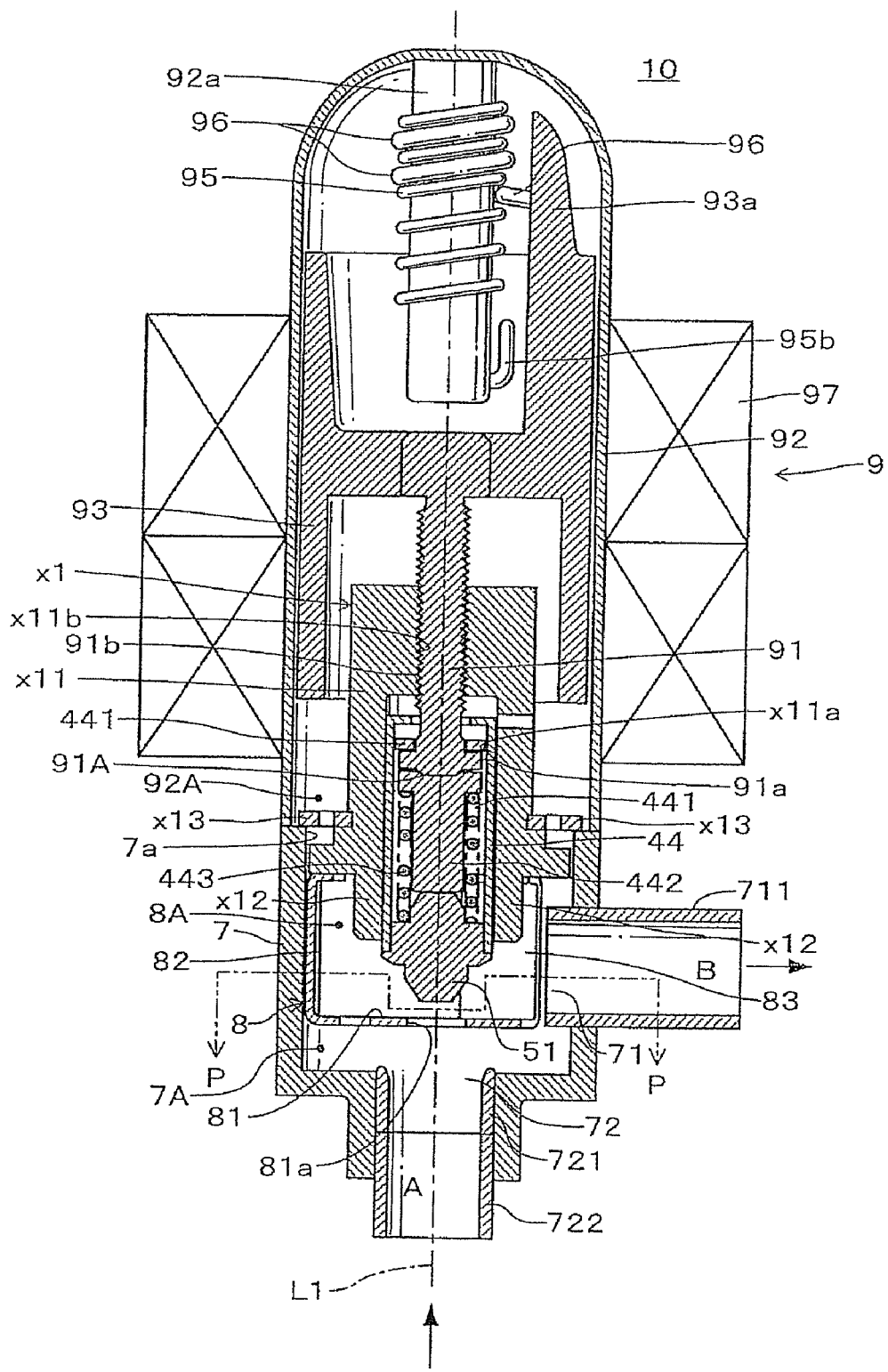
FIG. 7 is a vertical section view showing the opened compaction valve 10 according to the second embodiment.
Figure 8:
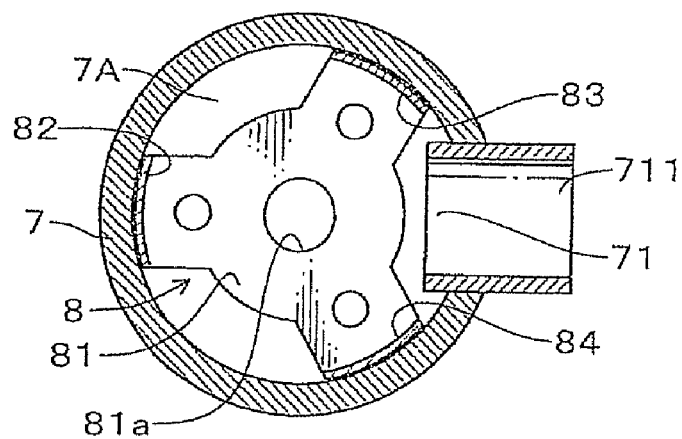
FIG. 8 is a section view taken on line P-P of FIG. 7.
Figure 9:
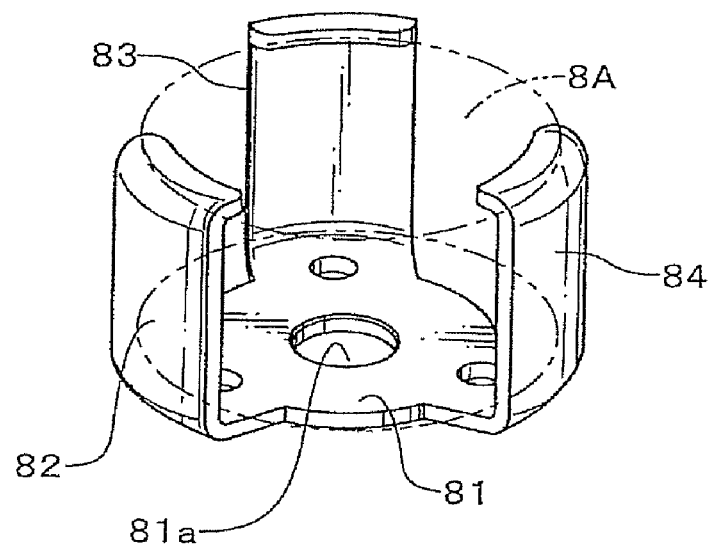
FIG. 9 is a perspective view showing the valve seat of the compaction valve 10 according to the second embodiment.

FIG. 6 is a vertical section view showing the closed compaction valve 10 according to the second embodiment. FIG. 7 is a vertical section view showing the opened compaction valve 10 according to the second embodiment. FIG. 8 is a section view taken on line P-P of FIG. 7. FIG. 9 is a perspective view showing the valve seat of the compaction valve 10 according to the second embodiment. Incidentally, the compaction valve 10 of the second embodiment is also used in the refrigeration cycle apparatus of FIG. 1.

This compaction valve 10 of the second embodiment includes a valve housing 7. A cylindrical main valve chamber 7A is formed in the valve housing 7. A joint pipe 711 is attached to an inner peripheral wall at one side of the main valve chamber 7A. An end of the joint pipe 711 is a first port 71 opening on the main valve chamber 7A. Further, a valve seat ring 721 and a joint pipe 722 are attached to an end of the main valve chamber 7A at the one side in the axis L1 direction. An end of the valve seat ring 721 is a second port 72. Incidentally, the valve seat ring 721 and the valve housing 7 may be formed integrally with each other.

A valve seat 8 is arranged in the main valve chamber 7A. The valve seat 8 is made by pressing a metal plate, and composed of a circular disk 81 perpendicular to the axis L1 of the main valve chamber 7A, and three guiding plates 82, 83, 84. The guiding plates 82, 83, 84 extends to three directions from a periphery of the circular disk 81, and extends vertically parallel to the axis L1 in an L-shape. An inner part surrounded by the circular disk 81 and the three guiding plates 82, 83, 84 is a sub valve chamber 8A. Further, a valve port 81a communicating the sub valve chamber 8A with the second port 72 is formed in the center of the circular disk 81. As shown in FIG. 8, two guiding plates 83, 84 are disposed at both sides of ends of the joint pipe 711 of the first port 71. These two guiding plates 83, 84 compose a connecting part which always connects the sub valve chamber 8A with the first port 71.

Further, as the peripheries of the guiding plate 82, 83, 84 slidably contact an inside of the main valve chamber 7A, the valve seat 8 is slidable in the axis direction L1 in the main valve chamber 7A. Because a flow passing area of the valve port 81a is smaller than that of the first port 71, when the refrigerant flows via the second port 72, the compaction valve 10 is in the full open state as shown in FIG. 7. Thus, when the second port 72 is under high pressure, owing to the differential pressure between the second port 72 and the sub valve chamber 8A, the valve seat 8 is moved away from the second port 72 (valve seat ring 721).

A supporting member x1 is attached to an opening 7a at an upper end of the valve housing 7. The supporting member x1 is composed of a substantially cylindrical synthetic-resin-made holder x11, a fitting part x12 for fitting into the opening 7a of the valve housing 7, and a ring-shaped metallic flange x13. A guide hole x11a extending in the axis L1 direction is provided on the holder x11, and a female thread part x11b is formed at the upper center of the holder x11. A cylindrical valve holder 44 is fitted with the guide hole x11a slidably in the axis L1 direction.

The valve holder 44 is coaxial to the main valve chamber 7A. A valve body 51 of which end is in a needle shape is fixed to a bottom part at the sub valve chamber 8A side of the valve holder 44. The valve body 51 controls the flow rate of the fluid flowing from the first port 71 to the second port 72 by increasing or decreasing the opening area of the valve port 81a when the valve body 51 and the valve holder 44 move together in the sub valve chamber 8A of the valve seat 8 in the axis direction L1. Incidentally, the valve body 51 is movable between the lowest, full closed position shown in FIG. 6 and the highest, full open position shown in FIG. 7.

Further, the valve holder 44 is engaged with a rotor spindle 91 of a stepping motor 9 as a driving unit. A flange 91a is integrally formed at a lower end 91A of the rotor spindle 91. This flange 91a and an upper end of the valve holder 44 sandwich a washer 441. The lower end 91A of the rotor spindle 91 is rotatably engaged with an upper end of the valve holder 44. Owing to this engagement, the valve holder 44 is supported rotatably in a state that the valve holder 44 is suspended from the rotor spindle 91. Further, in the valve holder 44, a spring bearing 442 is disposed movably in the axis direction L1. A compression coil spring 443 is interposed between the spring bearing 442 and the valve body 51, and biased by a specific load. Thus, the spring bearing 442 is pushed upward and engaged with the lower end 91A of the rotor spindle 91.

A male thread part 91b is formed on the rotor spindle 91. This male thread part 91b is screwed with a female thread part x11b formed on a supporting member x1. Thus, as the rotor spindle 91 rotates, the rotor spindle 91 is moved in the axis direction L1.

A case 92 of the stepping motor 9 is hermetically fixed to an outer circumferential end of the valve housing 7 by welding or the like. The case 92 forms a cylindrical rotor chamber 92A. A magnet rotor 93 of which outer periphery is multi-pole-polarized is rotatably arranged in the rotor chamber 92A. The rotor spindle 91 is fixed to the magnet rotor 93. Further, a cylindrical guide 92a is suspended from a ceiling of the case 92.

Further, a spiral guiding line 95 attached to the outer periphery of the guide 92a, and a movable stopper 96 screwed with the spiral guiding line 95 are arranged in the case 92. A projection 93a is formed in the magnet rotor 93. As the magnet rotor 93 rotates, the projection 93a kicks around the movable stopper 96 so that the movable stopper 96 moves rotatingly up and down because the movable stopper 96 is screwed with the spiral guiding line 95. Then, when the movable stopper 96 contacts a stopper 95*b* at the lower end of the spiral guiding line 95, the valve stops closing.

Further, a stator coil 97 is arranged at the outer periphery of the case 92. When pulse signals are supplied to the stator coil 97, the stepping motor 9 rotates the magnet rotor 93 corresponding to the number of the pulse signals. Then, owing to the rotation of the magnet rotor 93, the rotor spindle 91 integrated with the magnet rotor 93 rotates. As the rotor spindle 91 rotates, the rotor spindle 91 moves in the axis direction L1, and the valve holder 44 and the valve body 51 move in the axis direction L1.

According to the above configuration, the compaction valve 10 of the second embodiment operates as described below. First, the high pressure refrigerant flows in from the joint pipe 711 (first port 71), and the flow rate of the refrigerant is controlled, then, the expanded refrigerant flows out from the joint pipe 722 (second port 72). In this case, because the first port 71, the main valve chamber 7A, and the sub valve chamber 8A are under high pressure, and the second port 72 is under low pressure, due to the differential pressure, the valve seat 8 is seated on the valve seat ring 721 to close the second port 72. Then, when the stepping motor 9 controls the position of the valve body 51 in the axis direction L1, the flow rate of the refrigerant flowing from the sub valve chamber 8A to a space between the valve body 51 and the valve port 81*a* is regulated.

On the other hand, the compressor 50 is stopped and the flow path switching valve 40 is switched. At this time, the stepping motor 9 controls to move the valve body 51 far away from the valve seat 8 (upward), and the compressor 50 is driven again. Because the valve body 51 is separated from the valve seat 8, when the refrigerant flows in from the joint pipe 722, while the valve seat 8 is seated on the valve seat ring 721, the second port 72 becomes under high pressure, and the main valve chamber 7A, the sub valve chamber 8A, and the first port 71 become under low pressure. Then, owing to the differential pressure of the refrigerant, the valve seat 8 moves away from the valve seat ring 721 (second port 72). Namely, the second port 72 is open. Thus, the refrigerant flows to the first port 71 via the second port 72 and the main valve chamber 7A.

Incidentally, the stepping motor 9 is driven by the pulse signals similar to the first embodiment. The flow control is operated in a range of 0 pulse to 480 pulses in the flow condition of the refrigerant shown in FIG. 6.

Thus, the expansion valve 10 according to the first and second embodiments can be both in a full open state (FIG. 3, FIG. 7) not to control the flow rate, and in a semi-closed state (FIG. 2, FIG. 6) to control the flow rate of the refrigerant. Therefore, the two expansion valves 10$_1$, 10$_2$ in the heat pump type refrigeration cycle apparatus shown in FIG. 1 are realized. Therefore, in the heat pump type refrigeration cycle apparatus, a large amount of refrigerant flows through the pipe line "a" in both cooling and heating modes, and the pressure loss is reduced.

In the valve seat 2 according to the second embodiment, because a wall facing the second port 12 is a tapered wall, if a little displacement occurs when the valve seat 2 seals (is seated on) the valve seat 2, the tapered wall works as the centripetal effect. However, in the valve seat 8 according to the second embodiment, because the flat circular disk seals the second port 72, a displacement occurs as a clearance between the valve seat 8 and the valve housing 7 when the valve seat 8 is seated. Thus, after the valve seat 8 is seated and before the flow pressure from the first port 71 to the second port 72 acts, a centering is performed by positioning the stepping motor 9 at a base position of 0 pulse, and by the valve body 51 fitting to the periphery of the valve port 81*a*. Further, even if the pressed valve seat of the second embodiment, when the wall of the circular disk 81 facing the second port 72 is formed tapered, the centripetal effect similar to the first embodiment is attained.

In the above embodiments, the differential pressure moves the valve seat away from the second port. When the differential pressure is small, an elevation of the valve seat may be insufficient, and pressure loss may be occurred. Therefore, preferably, the valve seat 2 of the first embodiment is made of resin or light metal such as aluminum. However, when the valve seat 2 is made of resin, if a dust is mixed in the pipe arrangement, the valve seat may be abraded remarkably. On the contrary, because the valve seat 8 of the second embodiment is made by pressing the metal plate, the valve seat 8 is light, and abrasion resistance is increased.

The expansion valve 10 is so configured to effectively equalize the pressure between the rotor chamber 92A and the main valve chamber 7A for preventing the malfunction, and preventing a foreign object from entering the rotor chamber 92A. A configuration of the expansion valve 10 will be explained.

FIG. 10 is composed of a partially broken side view (FIG. 10A), a bottom view (FIG. 10B), and a perspective view (FIG. 10C) showing the supporting member x1 as a first example of the expansion valve 10 according to the second embodiment, and a sectional view (FIG. 10D) showing the valve housing 7. A smaller diameter part x12*a* is formed on the fitting part x12 of the supporting member x1 near the flange x13. As shown in FIG. 10B, the fitting part x12 is formed on a whole circumference of the fitting part x12, and has a concave shape in a radial direction perpendicular to the axis direction L1. Further, a communicating path x13*a* for communicating with the rotor chamber 92A and the smaller diameter part x12*a* is formed on the flange x13. Four communicating paths x13*a* are formed around the axis direction L1. An inner diameter of the communicating path x13*a* is about 1 mm.

An outer diameter φd2 of an outer circumference of the fitting part x12 is formed 0.3 mm (specific amount) smaller than an inner diameter φd3 of an inner circumference of the valve housing 7. Thereby, a 0.15 mm-width gap x12*b* (see FIG. 6) is formed between the outer circumference of the fitting part x12 and the inner circumference of the valve housing 7. A pressure equalizing path communicating the rotor chamber 92A with the main valve chamber 7A is composed of the gap x12*b*, the smaller diameter part x12*a*, and the communicating path x13*a*.

Owing to a screw feed mechanism composed of the male thread part 91*b* of the rotor spindle 91 and the female thread part x11*b* of the supporting member x1, similar to the above described, as the magnet rotor 93 rotates, the rotor spindle 91 is moved in the axis direction L1. Thereby, the valve body 51 together with the valve holder 44 is moved in the axis direction L1, and the flow rate of the fluid is controlled. Further, when the valve body 51 is moved, the pressure of the rotor chamber 92A and the main valve chamber 7A are equalized owing to the gap x12*b*, the smaller diameter part x12*a*, and the communicating path x13*a*.

A total opening cross-sectional area of the pressure equalizing path in the flow direction of the refrigerant is respectively set as below in the gap x12*b*, the smaller diameter part x12*a* (concave part), and the communicating path x13*a*. The total opening cross-sectional area of the smaller diameter part x12*a* is sufficiently larger than that of the communicating paths x13*a* (sum of four paths). The total opening cross-sectional area of the gap x12*b* is also larger than that of the communicating paths x13*a*. Further, as described above, the diameter of the communicating path x13a is about 1 mm, and has a sufficient total opening cross-sectional area for smoothly equalizing the pressure between the rotor chamber 92A and the main valve chamber 7A. Accordingly, the total pressure equalizing path can smoothly equalize the pressure between the rotor chamber 92A and the main valve chamber 7A. In contrast, the width of the gap x12b is 0.15 mm and sufficiently smaller than the diameter φd1 about 1 mm of the communicating path x13a, thereby a foreign object is prevented from entering the rotor chamber 92A from the main valve chamber 7A.

Namely, the gap x12b is composed of the outer circumference of the fitting part x12 and the inner circumference of the valve housing 7 of which diameters are several orders of magnitude larger than the diameter φd1 of the communicating path x13a (about 1 mm). Therefore, while making the width of the gap x12b smaller, the total opening cross-sectional area can become sufficiently larger. Thus, both the smooth pressure equalization and the prevention of entry of foreign objects can be attained at the same time.

Figure 11A:
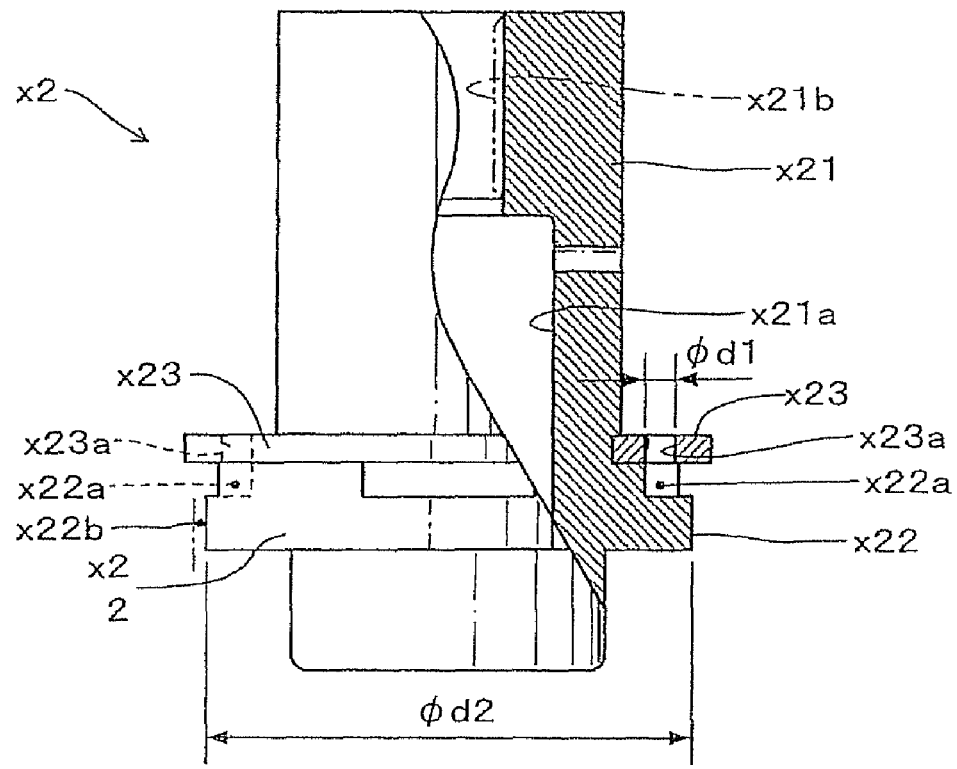
FIGS. 11A and 11B are a partially broken side view and a bottom view showing a supporting member as a second example of the expansion valve according to the second embodiment.
Figure 11B:
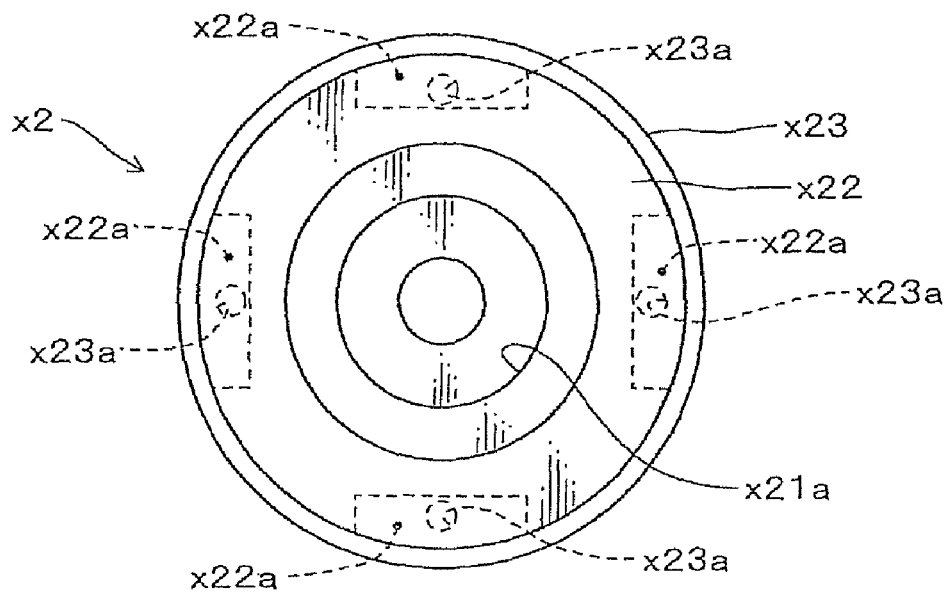
Figure 12A:
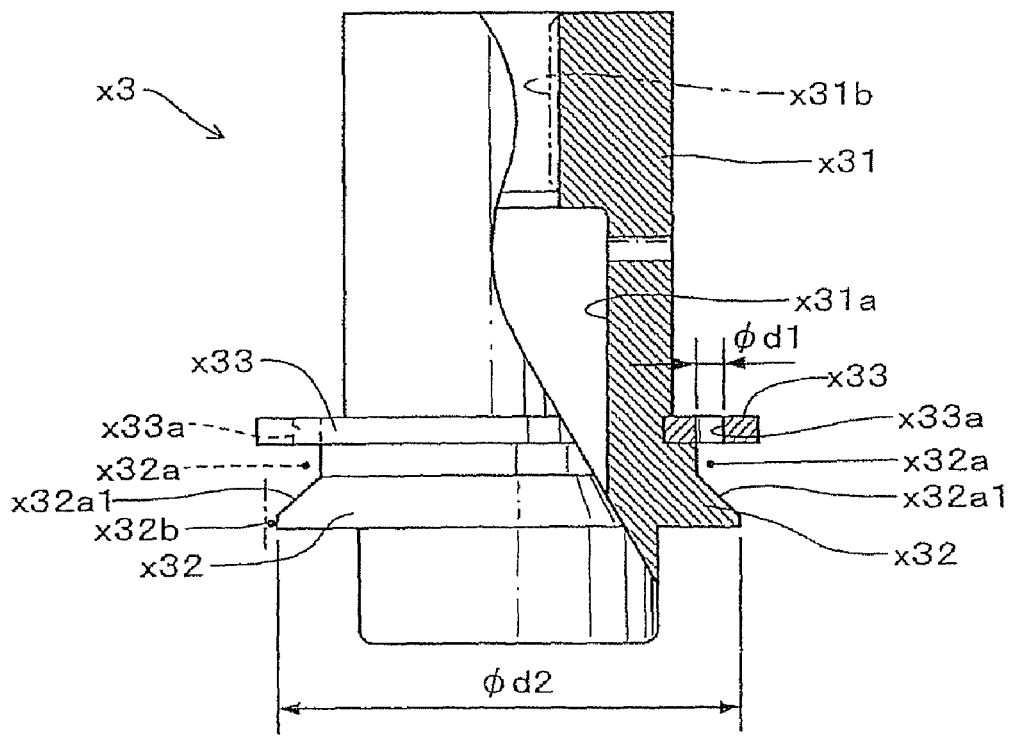
FIGS. 12A and 12B are a partially broken side view and a bottom view showing a supporting member as a third example of the expansion valve according to the second embodiment.
Figure 12B:
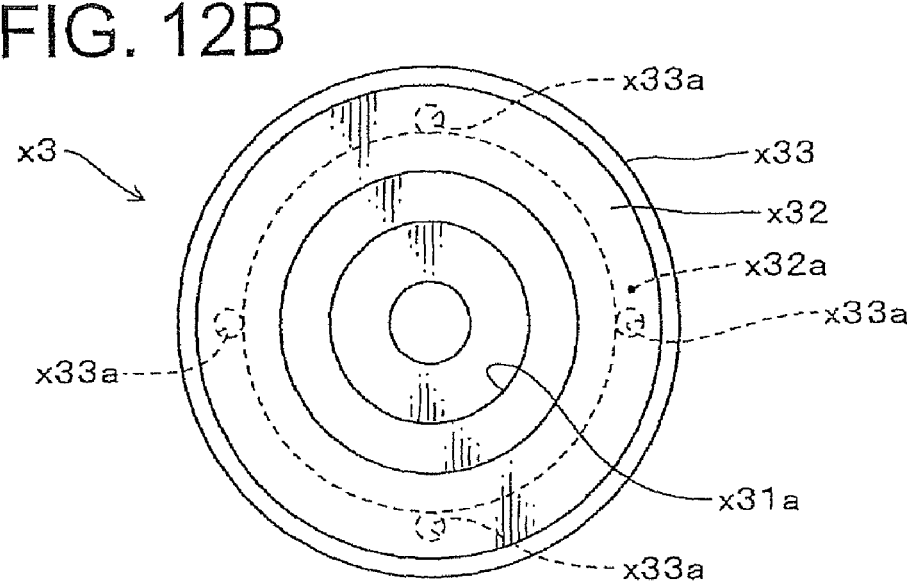

FIG. 11 is composed of a partially broken side view (FIG. 11A) and a bottom view (FIG. 11B) showing the supporting member x2 as a second example of the expansion valve 10 of the second embodiment. FIG. 12 is composed of a partially broken side view (FIG. 12A) and a bottom view (FIG. 12B) showing the supporting member x3 as a third example of the expansion valve 10 of the second embodiment.

In the second example shown in FIG. 11, the supporting member x2 is attached to the opening 7a at the upper end of the valve housing 7. The supporting member x2 is composed of a substantially cylindrical synthetic-resin-made holder x21, a fitting part x22 for fitting into the opening 7a of the valve housing 7, and a ring-shaped metallic flange x23. A guide hole x21a extending in the axis L1 direction is provided on the holder x21, and a female thread part x21b is formed at the upper center of the holder x21. The cylindrical valve holder 44 is fitted with the guide hole x21a slidably in the axis L1 direction. Further, the male thread part 91b of the rotor spindle 91 is screwed with the female thread part x21b of the supporting member x2. The screw feed mechanism is composed of the male thread part 91b of the rotor spindle 91 and the female thread part x21b of the supporting member x2.

A concave part x22a is formed on the fitting part x22 of the supporting member x2 at the flange x23 side. Four concave parts x22a are arranged around the fitting part x22 in a hollow shape radially perpendicular to the axis direction L1. Further, a communicating path x23a for communicating with the rotor chamber 92A and the concave part x22a is formed on the flange x23. Four communicating paths x13a are formed around the axis direction L1. An inner diameter φd1 of the communicating path x23a is about 1 mm.

The relationship between the outer diameter φd2 of an outer circumference of the fitting part x22 and the inner diameter φd3 of the inner circumference of the valve housing 7 is the same as the first example. A 0.15 mm-width gap x22b (FIG. 11A) is formed between the outer circumference of the fitting part x22 and the inner circumference of the valve housing 7. A pressure equalizing path communicating the rotor chamber 92A with the main valve chamber 7A is composed of the gap x22b, the concave part x22a, and the communicating path x23a. Further, the operation is the same as the first example. When the valve body 51 is moved, the pressure of the rotor chamber 92A and the main valve chamber 7A is equalized owing to the gap x22b, the concave part x22a, and the communicating path x23a.

In this second example, the relationship of the total opening cross-sectional area of the gap x22b, the concave part x22a, and the communicating path x23a is similar to that of the gap x12b, the smaller diameter part x12a, and the communicating path x13a in the first example. Thereby, similar to the first example, both the smooth pressure equalization with the total pressure equalizing path and the prevention of entry of foreign objects with the gap x22b can be attained at the same time.

In the third example shown in FIG. 12, the supporting member x3 is attached to the opening 7a at the upper end of the valve housing 7. The supporting member x3 is composed of a substantially cylindrical synthetic-resin-made holder x31, a fitting part x32 for fitting into the opening 7a of the valve housing 7, and a ring-shaped metallic flange x33. A guide hole x31a extending in the axis L1 direction is provided on the holder x31, and a female thread part x31b is formed at the upper center of the holder x31. The cylindrical valve holder 44 is fitted with the guide hole x31a slidably in the axis L1 direction. Further, the male thread part 91b of the rotor spindle 91 is screwed with the female thread part x31b of the supporting member x3. The screw feed mechanism is composed of the male thread part 91b of the rotor spindle 91 and the female thread part x31b of the supporting member x3.

A concave part x32a is formed on the fitting part x32 of the supporting member x3 at the flange x33 side. This concave part x32a is formed on a whole circumference of the fitting part x32 and has a concave shape in a radial direction perpendicular to the axis direction L1. An inner wall of the concave part x32a at the main valve chamber 7A side is formed in a taper wall x32a1 in a manner that a sectional area perpendicular to the axis direction L1 becomes larger toward the rotor chamber 92A. A communicating path x33a for communicating with the rotor chamber 92A and the concave part x32a is formed on the flange x33. Four communicating paths x33a are formed around the axis direction L1. An inner diameter φd1 of the communicating path x33a is about 1 mm.

The relationship between the outer diameter φd2 of an outer circumference of the fitting part x32 and the inner diameter φd3 of the inner circumference of the valve housing 7 is the same as the first example. A 0.15 mm-width gap x32b (FIG. 12A) is formed between the outer circumference of the fitting part x32 and the inner circumference of the valve housing 7. A pressure equalizing path communicating the rotor chamber 92A with the main valve chamber 7A is composed of the gap x32b, the concave part x32a, and the communicating path x33a. Further, the operation is the same as the first example. When the valve body 51 is moved, the pressure of the rotor chamber 92A and the main valve chamber 7A is equalized owing to the gap x32b, the concave part x32a, and the communicating path x33a.

In this third example, the relationship of the total opening cross-sectional area of the gap x32b, the concave part x32a, and the communicating path x33a is similar to that of the gap x12b, the smaller diameter part x12a, and the communicating path x13a in the first example. Thereby, similar to the first example, both the smooth pressure equalization with the total pressure equalizing path and the prevention of entry of foreign objects with the gap x32b can be attained at the same time.

Further, owing to the taper wall x32a1 of the concave part x32a, the sectional area of the concave part is larger toward the rotor chamber 92A, thereby loss factor can be reduced, and the pressure loss of the pressure equalizing path can be reduced.

Figure 13A:
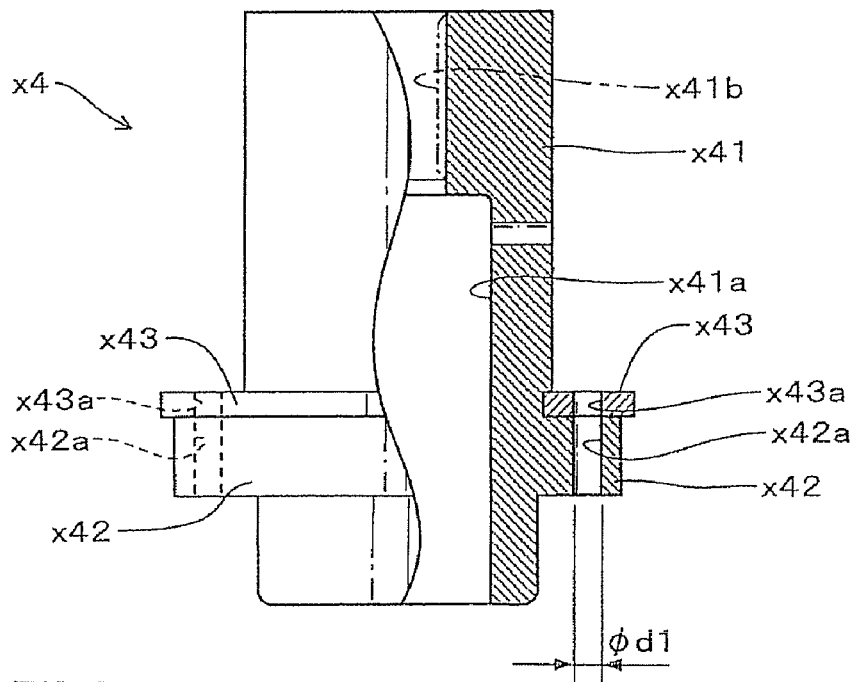
FIGS. 13A and 13B are a partially broken side view and a bottom view showing a supporting member of a conventional expansion valve.
Figure 13B:
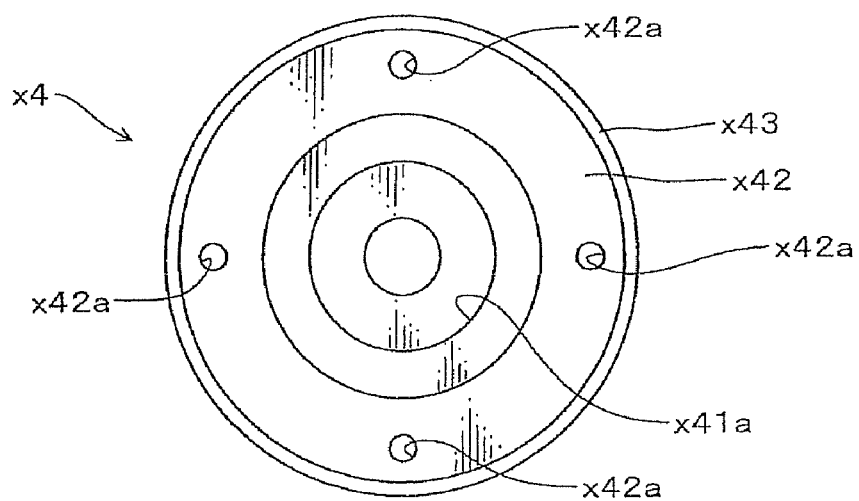

FIG. 13 is composed of a partially broken side view (FIG. 13A) and a bottom view (FIG. 13B) showing a supporting member x4 of a conventional expansion valve. The conventional supporting member x4 is composed of a holder x41, a fitting part 42, and a flange x43, and a guide hole x41a and a female thread part x41b are formed on the holder x41, which are substantially similar to the previous embodiment. Pressure equalization holes x42a, x43a penetrating straight from a valve chamber 10A to the rotor chamber 92A is formed on the fitting part x42 and the flange x43, which is different from the previous embodiment. Four pressure equalization holes x42a, x43a are formed around the axis direction L1. An inner diameter φd1 of each of the pressure equalization holes x42a, x43a is about 1 mm.

Because the inner diameter φd1 of each of the conventional pressure equalization holes x42a, x43a is defined by a diameter of a drill for drilling a hole, there is a limit to minimize the diameter φd1=W1. Therefore, there is a limit to prevent the foreign objects from entering. In contrast, the width W2 of the gap x12b, x22b, x32b of the first to third examples is:

$$W2=(\phi d3-\phi d2)/2.$$

Namely, by adjusting the outer diameter φd2 of the fitting parts x12, x22, x32 with respect to the inner diameter φd3 of the valve housing 7, the width W2 of the gaps x12b, x22b, x32b is easily minimized, and the entry of the foreign objects can be prevented.

Further, an opening area A1 of the conventional pressure equalization holes x42a, x43a is:

$$A1=\pi(\phi d1/2)^2 n \text{ (in the previous example, } n=4\text{)}$$

In contrast, an opening area A2 of the outer circumference of the gaps x12b, x22b, x32b is:

$$A2=\pi[(\phi d3/2)^2-(\phi d/2)^2]$$

Namely, by adjusting the outer diameter φd2 of the fitting parts x12, x22, x32, it is possible that A1 is several orders of magnitude smaller than A2, while W1 is several orders of magnitude larger than W2. While preventing the foreign object from entering, high pressure equalization effect can be attained.

In the first to third examples, φd2 is 0.3 mm smaller than φd3, and the width of the gaps x12b, x22b, x32b is 0.15 mm. However, φd2 may be 0.1 to 0.4 mm smaller than φd3, and the width of the gaps x12b, x22b, x32b may be 0.05 to 0.2 mm.

In the first to third examples, the communicating path (x13a, x23a, x33a) communicates with the gap (x12b, x22b, x23b) via the smaller diameter part or the concave part (x12a, x22a, x32a). However, by eliminating the smaller diameter part or the concave part (x12a, x22a, x32a), and by forming the communicating path (x13a, x23a, x33a) slightly displaced outward in the radial direction, the communicating path (x13a, x23a, x33a) and the gap (x12b, x22b, x23b) may directly communicate with each other.

Incidentally, in general, the air handling unit is provided with a filer for catching the foreign objects in the unit. A mesh size of this filter is generally 80 to 120 mesh (80 to 120 mesh per inch) both domestic and overseas. Therefore, a gap for preventing the foreign objects from entering the rotor chamber from the main valve chamber during the refrigerating cycle is about 80 to 120 mesh (for example, 0.15 mm), and each of the gaps x12b, x22b, x23b of the first to third examples is accordingly 0.15 mm width.

Further, the embodiments of which gap width is about 80 to 120 mesh has been described. However, the gap width may be adjusted to the size of the foreign object to be prevented from entering the rotor chamber, and the present invention is not limited to 80 to 120 mesh.

When the foreign objects in the air handling unit are extremely small, it is necessary to change the mesh size of the filter smaller than 120 mesh. When the mesh size of the filter is smaller, an area of the wire composing the mesh is larger, and an area to pass the fluid is reduced. Thereby, pressure loss at the filter is increased. Accordingly, it is not preferable to make the mesh size of the filter smaller because the pressure loss of the air handling unit is increased.

So, when the gap of the expansion valve becomes smaller than 0.15 mm, the extremely small foreign objects can be caught by the gap, thereby it becomes unnecessary to make the mesh size of the filter very small. Resultingly, the pressure loss of the air handling unit can be reduced, and a great amount of refrigerant can be passed. Namely, when the air handling unit is provided with the filter, the filter does not block the flow of the refrigerant and the air handling unit can pass the great amount of refrigerant.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An expansion valve for controlling a flow rate of a refrigerant in a first flow direction of the refrigerant and for discharging the refrigerant in a second flow direction,
said expansion valve comprising:
a valve housing having a first port communicating with a cylindrical main valve chamber and with a side part of the main valve chamber, and a second port communicating with an end of the main valve chamber in an axial direction thereof;
a valve seat slidably disposed in the main valve chamber in the axial direction of the main valve chamber, and having a sub valve chamber opposed to the second port in the main valve chamber, a valve port for connecting the sub valve chamber to the second port, and a connecting hole for always connecting the sub valve chamber to the first port;
a valve plug for opening and closing the valve port of the valve seat by moving relative to the valve seat in the axial direction; and
a driving member for driving the valve plug in the axial direction,
wherein in a case that the first port is under high refrigerant pressure and the second port is under low refrigerant pressure, a flow rate of the refrigerant flowing from the sub valve chamber through a path between the valve plug and the valve port is controlled by closing the second port with the valve seat seated around the second port due to differential pressure between the first and second ports and by controlling a position of the valve plug in the axial direction with the driving member, and wherein in a case that the first port is under low refrigerant pressure and the second port is under high refrigerant pressure by making the refrigerant flow reversely, the refrigerant is discharged to the first port via the second port and the main valve chamber, said second port is opened by moving the valve plug in the axial direction with the driving member and by separating the valve seat from the second port due to the differential pressure between the second and first ports, wherein the driving member is composed of a rotor case fixed around an opening of the valve housing opposite to the first port to form a cylindrical rotor chamber, a rotor having a rotor shaft in the axial direction of the rotor chamber and the main valve chamber and rotatably and movably disposed in the rotor chamber in the axis direction, and a stator coil attached to an outer circumference of the rotor case and driving the rotor, and the valve body is disposed at the rotor shaft near the valve seat, said driving member further including a supporting member fixed to the opening of the valve housing for separating the main valve chamber from the rotor chamber and for supporting the rotor shaft of the rotor, and configured to control an opening of the valve port by moving the rotor and the rotor shaft in the axial direction with a screw mechanism of the supporting member and the rotor shaft using a rotation of the rotor, and configured to equalize the pressure between the main valve chamber and the rotor chamber when the rotor is moved in the axial direction using a pressure equalizing path communicating with the main valve chamber and the rotor chamber, wherein the supporting member includes: a fitting part for fitting into the opening of the valve housing; and a flange part fixed to an end around the circumference of the opening of the valve housing, wherein a communicating path opening at the rotor chamber side is formed on the flange, and an outer diameter of the fitting part is a specific amount smaller than an inner diameter of an inner circumference of the valve housing, wherein a concave part concaved in a radial direction perpendicular to the axial direction is formed on the fitting part at the flange side, and a gap between the outer circumference of the fitting part and the inner circumference of the valve housing communicates with the communicating path via the concave part, and wherein the pressure equalizing path is composed of the gap between the outer circumference of the fitting part and the inner circumference of the valve housing and the communicating path.

* * * * *